Nov. 28, 1933.    F. W. DAVIS    1,937,485
POWER STEERING GEAR
Filed Jan. 15, 1929    3 Sheets-Sheet 1
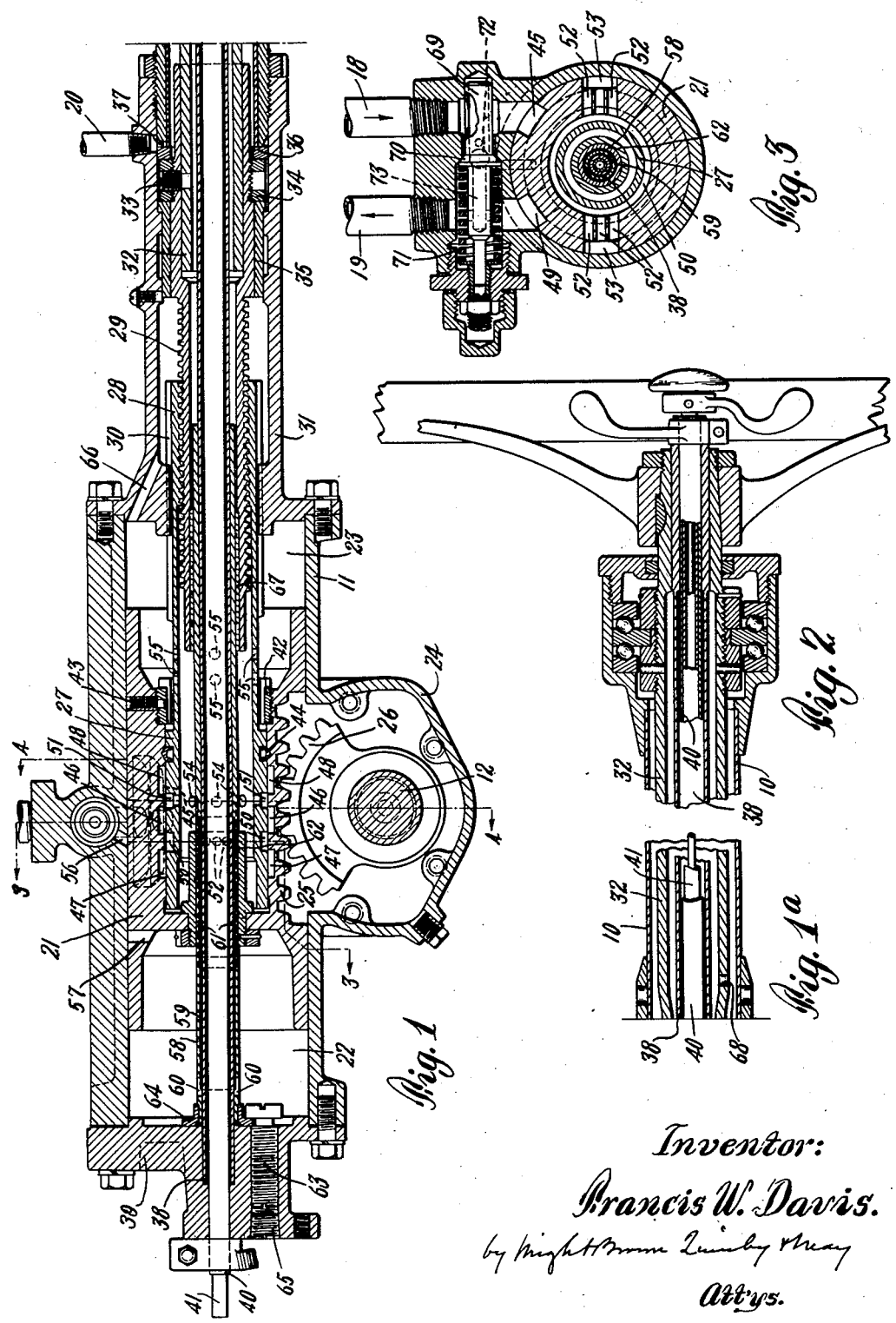
Inventor:
Francis W. Davis.

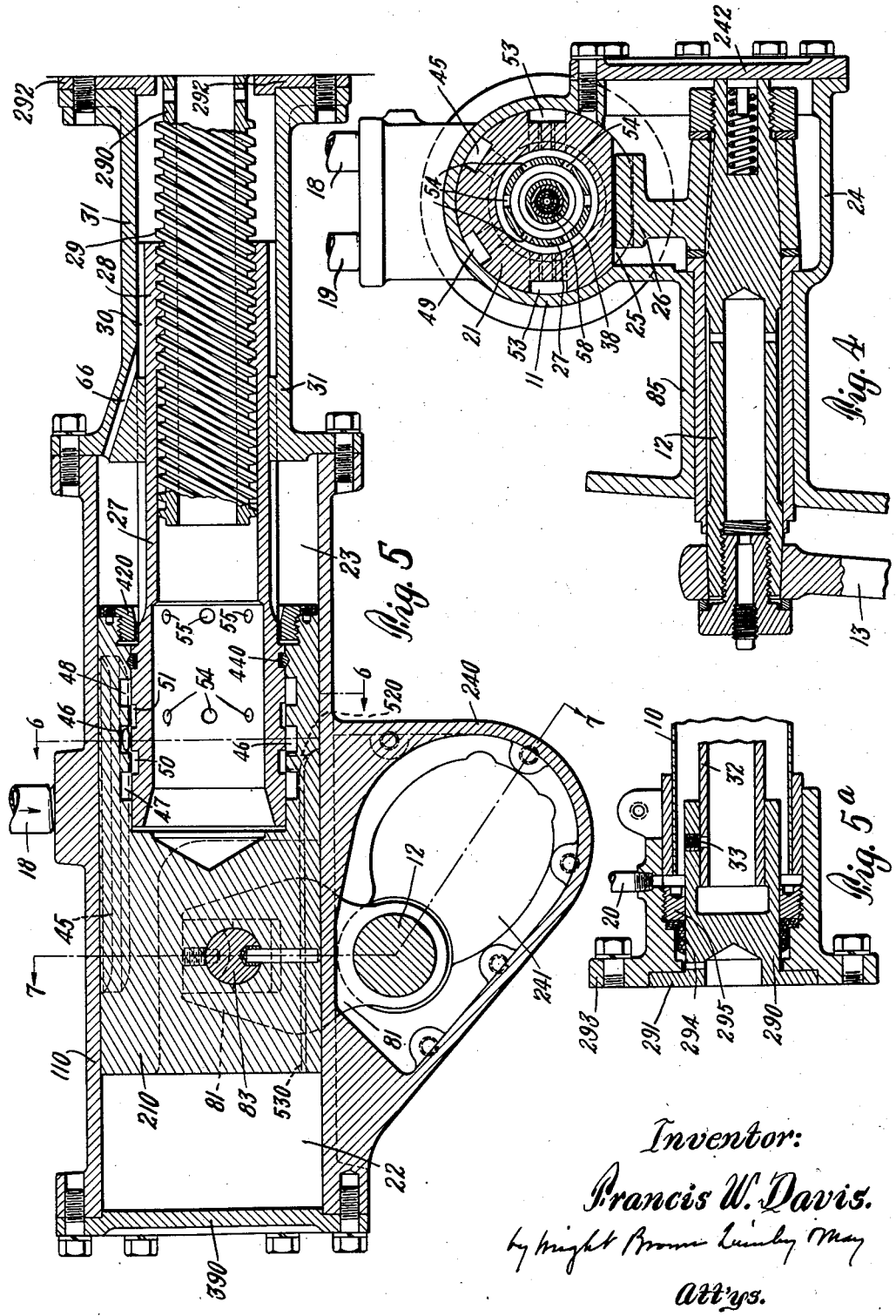

Nov. 28, 1933.  F. W. DAVIS  1,937,485
POWER STEERING GEAR
Filed Jan. 15, 1929  3 Sheets-Sheet 3
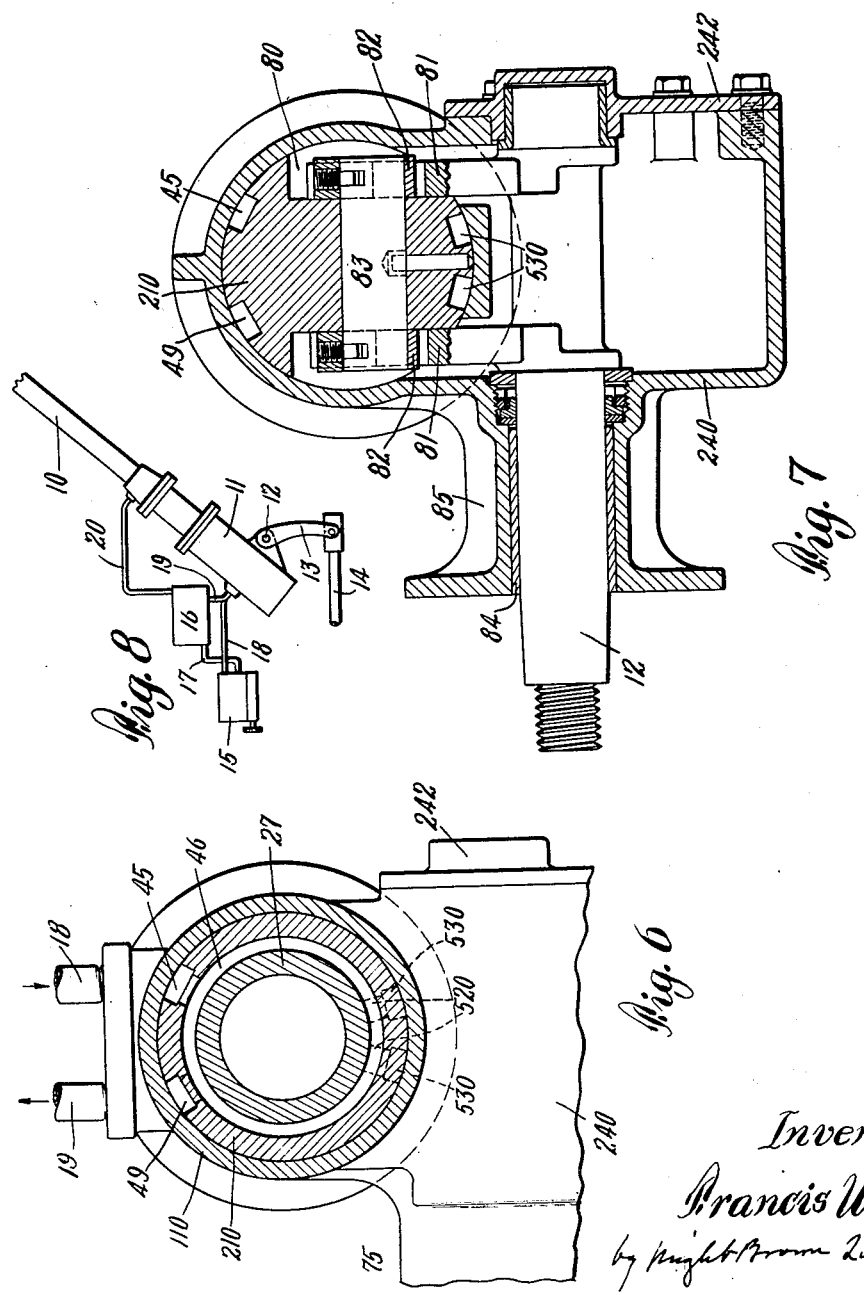

Patented Nov. 28, 1933

1,937,485

UNITED STATES PATENT OFFICE 1,937,485

POWER STEERING GEAR

Francis W. Davis, Waltham, Mass.

Application January 15, 1929. Serial No. 332,677

7 Claims. (Cl. 180—79.2)

This invention relates to certain improvements in the type of steering gear described and claimed in my application Serial No. 190,526 filed May 11, 1927. As therein disclosed, steering mechanism of this type may comprise a fluid-power-actuated piston which is mechanically connected to wheels of a vehicle to direct the course of the vehicle. Cooperating with the piston is a manually movable member which is arranged to move with the piston, but also is capable of a limited movement relative thereto. Such member may conveniently be in the form of a nut which is in threaded engagement with a portion of the steering post of an automobile. When the steering post is turned by manipulation of the steering wheel, the nut is caused to move along the post in an axial direction by being restrained from turning. If the nut reaches its limit of motion relative to the piston, it engages the latter and pushes it along, thus effecting a steering of the vehicle. This piston and nut, however, are formed with suitable ports and passages which constitute a pair of channels for fluid and valves for controlling the flow and pressure conditions of the fluid in these channels. Each of these channels communicates with a pressure chamber at the respective ends of the piston so that fluid pressures in the channels are directed against the opposite ends of the piston. As is hereinafter described the channels are normally open when the piston and nut are in a "neutral" relative position, permitting the power fluid to flow through the mechanism with practically no hindrance, so that practically no load is put on the fluid circulating pump except where steering effort is required.

While the principle of operation of the mechanism disclosed herein is substantially identical with that of the steering gear referred to in my copending application Serial No. 190,526, certain improved features are incorporated in the mechanism according to the present invention. These improvements include the provision of a drain pipe extending from the casing around the steering post to the circulatory system on the intake side of the pump by which the power fluid is circulated. The steering post casing, being tightly joined to the casing of the power cylinder, acts as a stand-pipe to receive whatever fluid may escape upwardly around the steering post from the power cylinder. This obviates the need for tight packing around the steering post since small quantities of power fluid working up from the cylinder along the steering post are easily carried off by the drain pipe. In this way, also, any air which may tend to collect in the upper end of the cylinder can work its way out of the cylinder and into the standpipe, escaping from the upper end of the latter to the atmosphere.

Various additional improvements will be apparent from the disclosure of the invention in the description thereof which follows, and from the drawings, of which,—

Figures 1 and 1ª represent in longitudinal section a steering gear embodying the invention.

Figure 2 shows in section a modified thrust bearing structure at the upper end of the steering column.

Figure 3 is a section on the line 3—3 of Figure 1.

Figure 4 is a section on the line 4—4 of Figure 1.

Figures 5 and 5ª show in longitudinal section a modified form of steering gear.

Figure 6 is a section on the line 6—6 of Figure 5.

Figure 7 is a section on the line 7—7 of Figure 5.

Figure 8 represents diagrammatically the various mechanisms connected together in a power circulating system.

Referring to Figure 8, a steering column of an automobile or similar vehicle is indicated at 10, a cylindrical casing 11 being secured below the column 10 and coaxial therewith. Mechanism in the cylinder 11 actuates a rocking shaft 12 to which is fixed a crank arm 13 suitably connected to a drag link 14 by which the vehicle wheels may be deflected in order to direct the course of the vehicle. In order to operate the power-actuable mechanism within the cylinder 11, a pressure pump 15 of any type suitable for the purpose may be provided, this pump being driven by connection with the vehicle motor or in any other desired way. As shown, the pump 15 may draw power fluid from a suitable reservoir 16 as by a suction pipe 17, the fluid being discharged through a pressure pipe 18 to the cylinder 11. Any suitable fluid may be employed, a liquid being preferred on account of its incompressibility. The power fluid will hereinafter be referred to as "oil", but it is to be understood that the invention contemplates the use of any other liquids or fluids, such as glycerine, water or the like. Oil leaving the cylinder 11 is conducted back to the reservoir 16 as by a discharge pipe 19. Instead of attempting to provide a fluid-tight packing for the upper end of the cylinder 11, where it communicates with the column 10, I prefer to employ a closely-fitting bearing sleeve about the rotatable steering post which substantially confines the oil to the cylinder but past which a small seepage of oil may take place from the cylinder into the steering column. I also provide means for draining the oil which has thus seeped into the column back to the reservoir 16 through a suitable pipe 20 as will be hereinafter described in detail. The column 10, moreover, being connected to the suction pipe 17 through the reservoir 16, is in itself a reservoir for spare oil to supplement the reservoir 16. As the active oil in the system is substantially constant in quantity, a reservoir is needed only for spare oil sufficient to make up losses from leakage, and to take care of thermal expansion of the oil in the system. Hence the reservoir 10 may be used either in addition to or in lieu of the reservoir 16.

Figure 1 illustrates the working parts of one form of steering gear embodying the invention. This steering gear comprises essentially the cylinder 11 which with a piston 21, reciprocable therein, forms a pair of pressure chambers 22, 23. The cylinder casing 11 may be formed with an outwardly extending portion 24 to house a portion of the cross shaft 12 and mechanism connecting this shaft with the piston 21. As shown the piston 21 is formed with a gear rack 25 on one side thereof, this rack meshing with a gear sector 26 which is fixed on the shaft 12. Thus reciprocatory motion of the piston 21 results in a rocking of the shaft 12, hence in reciprocation of the drag link 14 through the crank arm 13. This rack and gear sector connection is mechanically efficient and is particularly suitable for service in connection with the power-actuated piston. The piston 21 is formed with a longitudinal bore within which is slidably fitted a valve slide 27, the valve slide and piston being provided with a system of ports and passages by which the flow of oil is controlled so as to act against one end or the other of the piston whenever there is relative movement between the piston and the slide, the direction of such movement of the piston being such as to follow the motion of the slide 27. The slide 27 is provided with an extended portion 28, this extension having an internally threaded portion which is in threaded engagement with a threaded portion 29 of the steering post. The extension 28 is formed on its outer surface with a series of splines 30 which engage in grooves formed in an inwardly projecting portion of an extension 31 of the casing 11 which serves as a cylinder head for the power cylinders. The extension 31 connects the casing 11 with the lower end of the steering column 10. These splined receiving grooves may be conveniently broached in the cylinder head or otherwise formed therein. The splines 30 permit longitudinal reciprocation of the slide 27, but prevent any rotation thereof. These splines thus take the rotational thrust of the steering post on the threaded portion of the slide.

Within the column 10 is a hollow steering post 32, the post being shown as composed of two members, the lower one of which is the threaded portion 29. The two parts of the steering post may be telescoped for a portion of their length as shown in Figure 1, a set screw 33 being employed to keep them together. As shown this set screw also holds in place a friction ring 34 which, with a sleeve 35 and a washer 36, forms a thrust lock to take the longitudinal thrust of the steering post. Instead of providing a tight packing between the pressure chamber 23 and the interior of the steering column 10 I prefer to employ a closely fitting bearing sleeve about the post 32 which may result in a small leakage of oil upwardly into the space between the outer shell 10 of the column and the steering post 32. Since the steering post is normally located with a considerable upward slope, as indicated in Figure 8, the column acts as a standpipe for oil seeping upwardly from the chamber 23, this oil being permitted to drain back to the reservoir 16 through a pipe 20. As shown in Figure 1 a suitable port 37 may be provided to allow free drainage of oil within the steering column to the pipe 20. Within the steering post 32 is a sector tube 38, the lower end of which is fixed in the lower cylinder head 39 of the cylinder 11. Since the sector tube does not rotate, its lower end may readily be made oil-tight. Within the sector tube 38 there may be concentric control shafts 40 and 41 for actuation of the throttle and spark controls or for any other desirable purpose.

The valve slide 27 is limited as to its motion relative to the piston 21 by a transverse wall of the piston against which the lower end of the slide may come in contact, and by a collar 42 which may be screw-threaded into the interior of the piston after the slide has been introduced therein as shown in Figure 1. This collar 42 may be held in place as by a set screw 43 or by any other convenient means. The slide 27 and the piston 21 are constructed so as to have a normal or neutral relative position, this position being illustrated in Figure 1. Means tending to hold these members in this neutral position independently of the action of power fluid, may be provided. As herein shown, such means may comprise a spring ring 44 having a V-shaped outer periphery which is adapted to fit into a V-shaped circular recess 115 in the inner wall of the piston 21. Normally registering with the circular recess in the piston is a circular recess in the outer wall of the slide 27, this recess having a rectangular cross section and being adapted to receive the ring 44. The ring 44 is made of spring material and is so formed as to tend to press radially outward into the V-groove of the piston. It is thus apparent that relative motion of the slide 27 with reference to the piston 21 must result in an inward pressure of the ring 44 by reason of the action of the sloping walls of the groove in the piston on the sloping peripheral faces of the ring. Thus a restoring force is provided tending to move the piston and slide back to their normal positions. The presence of the restoring member results in a certain amount of "feel" in steering, the amount being regulable by the use of a spring ring having the correct stiffness for the purpose. Since the power action instantly follows any relative movement of the slide or piston from the neutral relative position, it is apparent that if the spring ring were omitted from the mechanism shown, the latter would be irreversible, that is, motions of the piston resulting from deflection of the vehicle wheels by irregularities in the road surface would be instantly opposed by the fluid pressure set up by the motion of the piston away from its neutral position relative to the valve slide. Thus the road shocks on the vehicle wheels would be entirely absorbed by the power system and none of their force would be transmitted to the steering wheel. The spring ring provides for the transmission of a small part of the force of each road shock to reach the steering wheel, so that the operator can be guided to some extent by his sense of touch in steering the vehicle. The spring ring also has the advantage of preventing unnecessary strain on the system which might result in case the steering wheel were accidentally turned while the vehicle was standing with a wheel alongside a curb or in a rut so that it could not follow the motion of the steering wheel. If this should happen when the pump was operating, the full fluid pressure would be exerted in one of the chambers in the cylinder until the steering wheel happened to be turned back. The possibility of such a situation is avoided by the spring ring or equivalent means.

Since the motion of the slide 27 relative to the piston 21 is narrowly limited, it is apparent that the steering gear can be manually operated independently of the presence of any power fluid. Rotation of the steering post 32 results in a longitudinal movement of the slide 27 which quickly takes up the small clearance between the lower end of the slide and the adjacent transverse wall of the piston or the clearance between the collar 42 and the adjacent shoulder of the slide. Thereafter the continued motion of the slide carries the piston along with it and thus deflects the vehicle wheels to direct the course of the vehicle.

Power fluid may be supplied to the cylinder 11 as by the supply pipe 18 through which it is introduced into a supply channel 45 cut in the outer wall of the middle portion of the piston 21. The inner wall of this portion of the piston is provided with three annular grooves of which the central groove 46 communicates with the supply channel 45. The other grooves 47, 48 communicate with a discharge channel 49 which, as shown in Figure 3, may be arranged symmetrically to the supply channel 45 to communicate with the discharge pipe 19 which leads back to the reservoir 16. In the outer wall surface of the slide 27 are cut two annular grooves 50 and 51. The groove 50 communicates as by a number of holes 52 with a pair of channels 53 which may be cut in the outer surface of the piston 21, and which lead to the chamber 22. Thus the groove 50 is at all times in communication with the chamber 22. In like manner the groove 51 is at all times in communication with the chamber 23 through series of holes 54 and 55. The normal or neutral relation between the piston and slide is such that the clearance between the side walls of the groove 46 and the adjacent walls of the grooves 50 and 51 are equal so that the flow of oil coming into the cylinder through the supply pipe 18 is split into two equal branches, part flowing through the groove 46 into the channel 50 and part into the channel 51. The grooves in the piston and slide are so spaced that the oil flowing into the channels 50 and 51 flows right out again into the grooves 47, 48 and thence into the discharge pipe 49 and pipe 19. The clearance between the grooves 50 and 47 and the grooves 51 and 48 are equal when the slide and piston are in their neutral position. If now the slide as shown in Figure 1 is moved toward the left when oil is being driven through the system, the motion of the slide relative to the piston partly or wholly closes the clearance between the supply groove 46 and the groove 50, thus partly or wholly cutting off the supply of oil to the chamber 22. At the same time a clearance between the supply groove 46 and the groove 51 is enlarged, thus facilitating access of the supply stream of oil to the chamber 23. This motion of the slide at the same time increases the clearance between the groove 50 and the discharge groove 47, thereby facilitating the escape of oil from the chamber 22 into the discharge pipe 19. The clearance between the groove 41 and the discharge groove 48, however, is partly or wholly closed so that the oil entering the groove 51 is restrained from escaping into the discharge groove 48 and pressure is thus built up in the groove 51, this pressure being instantly communicated to the chamber 23. This tends to cause motion of the piston toward the left, that is, in the direction of previous movement of the slide. This tendency on the part of the piston persists until it catches up with the slide or the slide is moved back so that the two members regain their neutral relative position. In like manner motion of the slide toward the right results in a building up of pressure in the chamber 22 which tends to move the piston toward the right. This action on the part of the oil is, in the apparatus illustrated, extremely sensitive and causes an instant response of the power mechanism to the slightest motion of the valve slide. When the parts are in their neutral position, however, the oil is permitted to flow freely through the grooves in the cylinder and the load on the pump 15 is very slight. The only time when a load is placed on the pump is when steering is actually being done. There is no constant static pressure against which the pump is required to work.

Since I may employ relatively high pressures in the operation of the steering gear, for example of the order of 300 pounds per square inch, it is desirable that this pressure be automatically relieved whenever the piston reaches either end of its stroke within the cylinder. Otherwise an operator might, under some circumstances, turn the steering wheel to its limit in one direction or the other and then add to the full oil pressure the manual force of his steering effort. These combined forces might be sufficient to damage the apparatus. A suitable relief is, therefore, supplied, this being in the form of a passage 56 through the wall of the cylinder 11 and communicating with the discharge pipe 19. A passage 57 through the wall of the piston 21 is adapted to register with the passage 56 when the piston reaches its limiting position toward the right as shown in Figure 1. Thus the pressure in the chamber 22 is automatically relieved when the piston moves to the limit of its stroke toward the right. In order to relieve the chamber 23 when the piston moves to the limit of its stroke toward the left, I may mount a suitable sleeve 58 on the sector tube 38, this sleeve fitting closely at its upper and lower end portions on the sector tube, but having an internal clearance as at 59 for a portion of its length intermediate the ends thereof. This clearance 59 forms a channel which communicates with the chamber 22 as by a series of ports 60 through the wall of the sleeve 58. The channel 59 may also communicate, as by a series of ports 61, with the interior of the slide 27, that is, with the chamber 23, when the piston moves to the limit of its stroke toward the left.

Mounted within the piston is a sleeve 62 which is slidably fitted on the sleeve 58. When the piston moves to the limit of its stroke toward the left the end of this sleeve may uncover the ports 61, thus connecting the chambers 23 and 22. Since at this time the regular exhaust port in the chamber 22 is wide open, the pressure from the chamber 23 may thus be relieved therethrough. In installing the steering gear in a vehicle, it is desirable to adjust these relief ports so that the pressure is relieved when the vehicle wheels reach their limits of deflection in either direction. To this end the cross shaft 12 is not secured to the crank arm 13 until the piston has been moved to its extreme position toward the right from the position shown in Figure 1, and the vehicle wheels have been deflected as far as possible in a corresponding direction. The crank arm 13 is thereupon secured to the cross arm 12 and suitably keyed against rotation relative thereto. The vehicle wheels are now deflected to their limiting position in the opposite direction, this resulting in a motion of the piston 21 to a position which should be its limiting position toward the left in Figure 1. When in this position, oil pressure is applied to the chamber 23 by operation of the pump 15. Then the sleeve 58 is adjustably moved toward the right, as by an adjustment screw 63 which acts on a flange 64 mounted on the end of the sleeve 58. Thus the sleeve is moved toward the right until the oil pressure gage drops, showing that the pressure in the chamber 23 has been relieved. This means that the ports 61 have been moved far enough to the right to clear the end of the sleeve 62. Thus the ports 61 are adjustably located in position to relieve the pressure in the chamber 23 when the vehicle wheels reach their corresponding limit of deflection. The adjusting screw 63 may be thereupon fixed in position as by burring the thread, after which a screw plug 65 may be inserted in the end of the aperture.

A suitable passage 66 may be provided to permit the escape of air bubbles which may collect in the upper end of the chamber 23, this air working its way upwardly into the space within the column 10 and thus escaping to the atmosphere at the top of this column.

Between the sleeve 58 and the lower portion 29 of the steering post I provide a friction member 67 which fits closely on the sleeve 58 and serves as an oil seal. Oil which may work past this member will rise within the steering post and escape to the space within the steering column 10 as through a suitable aperture 68 and thus pass out through the discharge pipe 20.

If desired, I may use a thrust bearing near the steering wheel, as shown in Figure 2, instead of the bearing illustrated in Figure 1. This may comprise a ball bearing, as shown, or friction disks as hereinbefore described. In Figure 3 is illustrated a by-pass between the supply pipe 18 and the discharge pipe 19, this by-pass containing a spring-pressed safety valve so that in case of obstruction in the cylinder 11, dangerous pressures in the supply pipe 18 may be avoided by escape of oil through the safety valve. As shown the valve member 69 may be elongated and may be provided with a ground face 70 engaging a suitable valve seat between the pipes 18 and 19. A spring 71 may be supplied to bear against a shoulder of the valve member 69 to press it against its seat. The member 69 is preferably hollow, the portion adjacent the supply pipe 18 having a chamber therein containing a ball valve 72. This chamber communicates with the pipe 18, the chamber 73 on the other side of the ball 72 communicating with the discharge pipe 19. Thus, in case of reverse of fluid in the system the ball is at once displaced from its seat and the oil is permitted to flow from the pipe 19 to the pipe 18 without hindrance. This feature is of value in case the pump 15 does not permit reverse flow therethrough. In such case, it would be difficult to steer the vehicle by hand if the pump were not operating.

A modified form of steering mechanism is illustrated in Figures 5, 5ª, 6 and 7. This form comprises a casing 110 with a cylindrical bore within which slides a piston 210. The lower end of the cylinder casing may be closed by a blank plate 390, an extension 31 being secured to the upper end of the casing. The piston 210 is bored for a portion of its length to receive a valve slide 27. The piston forms with the cylinder 110 a pair of pressure chambers 22, 23 by which oil or other fluid under pressure is used to actuate the piston. The control of the oil is by means of ports and passages in the piston and slide substantially as hereinbefore described in connection with the description of the operation of the mechanism illustrated in Figure 1. As hereinbefore described, oil is pumped through the supply pipe 18 into a longitudinal channel 45 whence it flows to a circular groove 46 in the inner wall of the piston. From this point the flow is divided equally into grooves 50 and 51 in the outer wall of the slide 27, as long as the piston and slide are in their neutral position.

A ring 440 of spring metal is used as previously described to hold the piston and slide resiliently in their neutral relative position. The motion of the slide 27 relative to the piston is limited by the inner end of the bore in which the slide moves and by a collar 420 which may be screwed into the end of the piston after the slide 27 has been inserted. The groove 50 is connected to the chamber 22 as by a pair of longitudinal channels 530 which communicate with the groove through suitable passages 520.

The groove 51 is connected to the chamber 23 as by ports 54 which admit the oil to the inside of the hollow slide 27, and the ports 55 which permit the oil to flow into the chamber 23. The control of the oil flow by these grooves and passages is identical with that hereinbefore described.

The slide 27 is held against rotational movement by suitable splines 30 formed on an extension 28, the splines having a sliding engagement in grooves broached or otherwise cut in the cylinder head which is a portion of the extension 31. The extension 28 of the slide 27 is internally threaded for a portion of its surface for engagement with the threaded member 290 which constitutes the lower part of a two-piece steering post, the upper part being partly shown in Figure 5ª. The member 290 may be provided with an outwardly extending flange 291, this flange being fitted between a ring 292 and a second extension 293 of the cylinder casing. The parts 292 and 293 act as a thrust bearing to prevent longitudinal motion of the steering post and to take the axial thrust resulting from the reaction of the slide 27 on the threaded portion of the member 290. A leather collar or washer 294 may be secured as by a ring nut 295 to encircle the steering post and to act as an oil seal between the chamber 23 and the interior of the column 10. There may, however, be a slight seepage of oil past the collar 294, in which case the escaping oil may be drained back into the reservoir as by a suitable pipe 20 which communicates with the space within the column casing 10.

A modified form of connecting linkage between the piston 210 and the cross shaft 12 is shown in connection with this mechanism. The sides of the piston are recessed as at 80 to receive a pair of forks 81 between the arms of which are slidable blocks 82. These blocks are centrally bored to receive a pin 83 which passes through both blocks and transversely through the piston 210. The forks 81 are securely mounted on the cross shaft 12 or may be formed integral therewith. In order to simplify the casing structure, a housing 240 may be formed integral with the casing 110, this housing having an opening 241 sufficiently large to receive the shaft 12 and the forks 81. The shaft is slid through its bearing 84 which is mounted in a lateral extension 85 of the casing 240, the forks being extended downwardly so as to enter the opening 241. When the shaft is seated in its normal position the forks are swung upwardly and the piston is at the same time introduced into the cylinder casing 110 from the right as shown in Figure 5, the pin 83 and the blocks 82 having previously been mounted in place in the piston. The blocks are introduced between the prongs of the forks 81 and the piston is then pushed to its position as shown in Figure 5, the remaining parts of the mechanism being subsequently assembled. The opening 241 is closed with a suitable plate 242.

Having thus described an embodiment of this invention, it should be evident to those skilled in the art that various changes and modifications might be made therein without departing from the spirit or scope as defined by the appended claims.

I claim:

1. A steering mechanism comprising a cylinder, a steering post having its lower end portion entering an end of the cylinder, a casing around said post extending upwardly from said cylinder, a nut reciprocable in said cylinder, said nut having an upward extension projecting into said casing, said extension being in internal threaded engagement with the lower portion of said post, and in external splined engagement with a portion of said casing, and steering connections to said nut.

2. A steering mechanism comprising a cylinder, a steering post having a threaded lower portion projecting into an end of said cylinder, a casing around said post extending upwardly from said cylinder and having a portion forming a cylinder head through which said post passes, a nut in said cylinder having a portion in threaded engagement with said post and in splined engagement with said cylinder head, steering connections to said nut, and a thrust bearing for said post above said cylinder head.

3. In combination with a power steering mechanism which includes a cylinder, a fluid-actuable piston within said cylinder, and a normally open fluid circulating system with a supply pipe to and a discharge pipe from the cylinder; a by-pass connection between said supply and discharge pipes, said by-pass connection having a two-way relief valve therein including a spring-loaded portion opposing flow of fluid from the supply pipe to the discharge pipe, said portion consisting of a spring-pressed member having a perforation therethrough and an unloaded check member normally seated on said perforation and freely movable from its seat to permit flow from the discharge pipe to the supply pipe when the pressure in the former exceeds that in the latter.

4. In a power-actuated follow-up mechanism, a cylinder, a piston reciprocable in said cylinder, the ends of the piston forming with the cylinder a pair of opposed fluid pressure chambers, and means for varying fluid pressures in said chambers to cause said piston to move in said cylinder, said mechanism having sets of ports registering to form a relief passage for each of said chambers when the piston reaches a point near the limit of its stroke in a direction away from the chamber, said mechanism also including means for adjustably varying the point at which one of said sets of ports registers to form a relief passage.

5. A steering mechanism comprising a cylinder, a casing extending upwardly from said cylinder and coaxial therewith, a steering post within said casing, a hollow cylindrical piston slidable within said cylinder, steering connections to said piston, a nut having a cylindrical portion slidably fitted within said hollow piston, means for narrowly limiting axial movement of said nut relative to said piston, and an extension on said nut projecting into said casing and in splined engagement therewith, said extension also having threaded engagement with the lower end portion of said steering post.

6. A steering mechanism comprising a cylinder, a hollow piston reciprocable in said cylinder, a casing extending upward from an end of said cylinder and coaxial therewith, said casing having a lower portion forming a head for said cylinder, a steering post within said casing having its lower end threaded, a member slidably fitted within said piston, said member having a portion projecting through said cylinder head and in splined engagement therewith, said extension also being in threaded engagement with the lower end portion of said steering post, said piston and member having cooperating ports and passages constituting a control valve for the regulation of fluid pressures against the opposite ends of said piston.

7. In combination with a power steering mechanism which includes a cylinder casing, a piston within said cylinder forming therewith a pair of pressure chambers, and a normally open fluid circulating system including a valve within said casing adapted to control pressure conditions in said chambers, a supply pipe to and a discharge pipe from said casing, said pipes communicating with said valve, a by-pass connection in said casing between said supply and discharge pipes, said by-pass connection having a two-way relief valve therein, including a spring-loaded portion yieldably opposing flow of fluid from said supply pipe to said discharge pipe, and an unloaded check freely permitting flow from the discharge pipe to the supply pipe when the pressure in the former exceeds that in the latter.

FRANCIS W. DAVIS.